United States Patent [19]
Thornton

[11] Patent Number: 5,680,927
[45] Date of Patent: Oct. 28, 1997

[54] ELECTRICAL SWITCH

[75] Inventor: Eric Thornton, Canton, Mich.

[73] Assignee: United Technologies Automotive, Inc., Dearborn, Mich.

[21] Appl. No.: 723,680

[22] Filed: Sep. 30, 1996

[51] Int. Cl.[6] .................................................. H01H 13/62
[52] U.S. Cl. ........................... 200/565; 200/570; 200/571
[58] Field of Search .................................. 200/565, 570, 200/571, 564, 568, 43.08, 548, 549, 550

[56] References Cited

U.S. PATENT DOCUMENTS

| | | | |
|---|---|---|---|
| 1,700,310 | 1/1929 | Douglas | 200/571 |
| 2,980,770 | 4/1961 | Nabstedt | 200/565 |
| 3,025,377 | 3/1962 | Murray | 200/571 |
| 3,718,784 | 2/1973 | Wilkinson | 200/61.27 |
| 3,996,432 | 12/1976 | Sikora | 200/43.08 |
| 5,281,779 | 1/1994 | Bogovican et al. | 200/5 R |
| 5,316,497 | 5/1994 | Topolewski et al. | 439/752 |
| 5,374,792 | 12/1994 | Ghezzo et al. | 200/16 B |
| 5,382,169 | 1/1995 | Bailey et al. | 439/76 |
| 5,491,311 | 2/1996 | Muscat et al. | 200/4 |
| 5,528,007 | 6/1996 | Williams et al. | 200/16 B |

*Primary Examiner*—David J. Walczak
*Attorney, Agent, or Firm*—Emch, Schaffer, Schaub & Porcello Co., L.P.A.

[57] ABSTRACT

An electrical switch for use in the automotive field. The switch preferably has rotary actuation with a plurality of electrical contacts. The electrical switch comprises an insulator body having an internal recess defining a plurality of cavities, each cavity housing a pair of electrical contacts. A detent carrier is at least partially housed within the recess. The detent carrier also defines a cylindrical guide tube having a longitudinal axis. The tube houses a generally cylindrical electrically conductive plunger and a means for moving the plunger forward and backward along the longitudinal axis. When extended, the plunger makes electrical contact with the electrical contacts in a cavity of the insulator body.

16 Claims, 1 Drawing Sheet

U.S. Patent  Oct. 28, 1997  5,680,927

ELECTRICAL SWITCH

TECHNICAL FIELD

This invention relates to electrical switches for use in the automotive field. More particularly, the switches have rotary actuation with a plurality of electrical contacts.

BACKGROUND OF THE INVENTION

One example of such an electrical switch is a vehicle headlamp switch which turns the headlights on and off and switches from high beam to low beam. Another example would be windshield wiper switches with multiple speed positions.

Conventional switches of this type often utilize separate switch mechanisms, each moved with either the rotary or the push/pull actuating motions. This often necessitates separate switching elements and thereby leads to manufacturing difficulties, increased assembly costs and increased piece costs. In addition, reliability is usually decreased with an increased number of separately moving parts. For example, conventional switches use floating contacts which are separate from any mechanical detent system.

Separate switching parts typically require additional space. Space requirements always are of great concern in the automotive field. The industry is giving switch designers substantially less space within which to provide reliable and functional switches. A need continues to exist for electrical switches which are simple to manufacture, low in cost and reliable to use.

DISCLOSURE OF INVENTION

The electrical switch of this invention comprises an insulator body having an internal recess defining a plurality of cavities, at least one cavity housing a pair of electrical contacts.

A detent carrier is at least partially housed within the recess. The detent carrier also defines a cylindrical guide tube having a longitudinal axis. The tube houses a generally cylindrical electrically conductive plunger and a means for moving the plunger forward and backward along the longitudinal axis. The means for moving the plunger preferably is a spring. The spring brings the plunger into electrical engagement with a pair of electrical contacts in a cavity of the insulator body when the tube is adjacent the cavity. Raised shoulders between the cavities move the plunger away from the cavities when the detent carrier is rotated to a position when the tube is adjacent the shoulders.

The switches of this invention use a carrier which is connected to the knob, lever, or other selector device. A hole in the carrier houses the spring and plunger. The spring fits inside the hole beneath the plunger. The plunger, which is made of copper, brass, or some other highly conductive metal has the ability to move vertically within the hole. The terminal block is made of a high-hardness polymer, such as reinforced nylon. The terminals are insert-molded into the terminal block, and are made of brass, copper, or other conductive metal. A portion of the two current-carrying terminals line either side of each detent position and are exposed through the plastic. When the plunger goes into position, it completes the circuit between the two terminals. These switches use fewer components than previous designs. This results in lower cost, quicker assembly, and less tolerance stackup. Selection of circuit will always be synchronized with mechanical detent change. This ensures that contacts are always in the correct position.

Previous designs also use floating contacts which are separate from, but linked to, the mechanical detent system. This new design integrates the circuit selection system with the mechanical detent system. Since all switching occurs after the detent trip point, switching in my invention is done at high speed and results in improved switching. Finally, my design can be produced for less cost and fewer parts.

BEST MODE OF CARRYING OUT INVENTION

Figure 1:
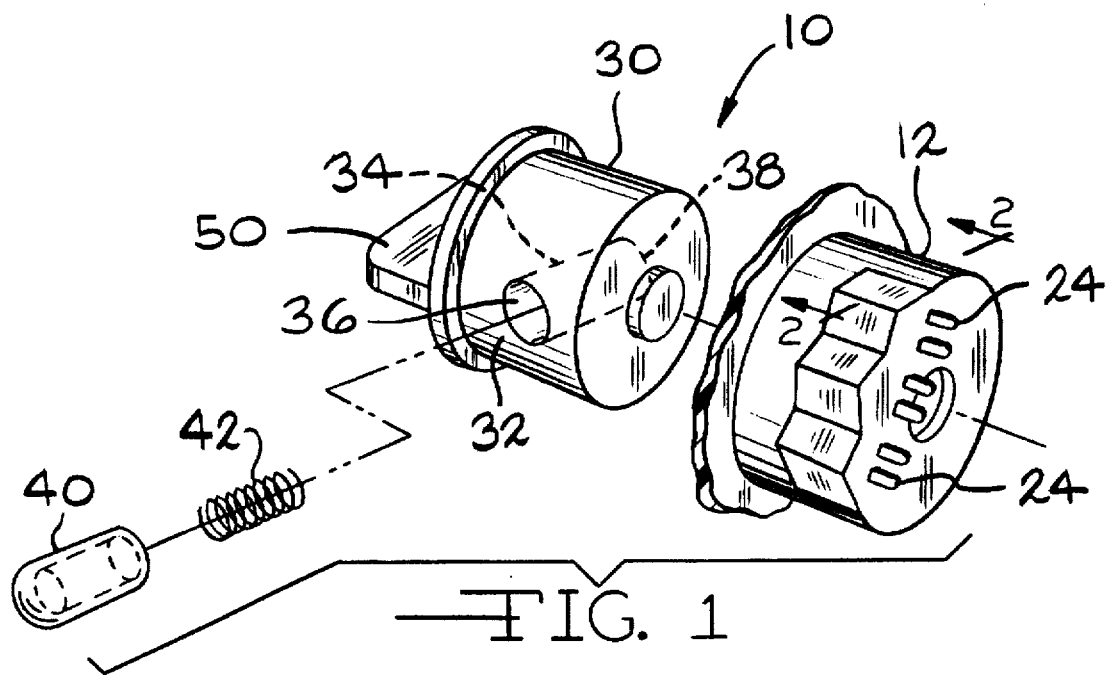
FIG. 1 a fragmentary perspective view of an electrical switch according to this invention.

FIG. 1 is a fragmentary view of the switch of this invention. FIG. 1 shows the parts in disassembly order. FIG. 1 especially shows the relationship between detent carrier 30, insulator body 12, electrical contacts 24, plunger 40 and spring 42.

Figure 2:
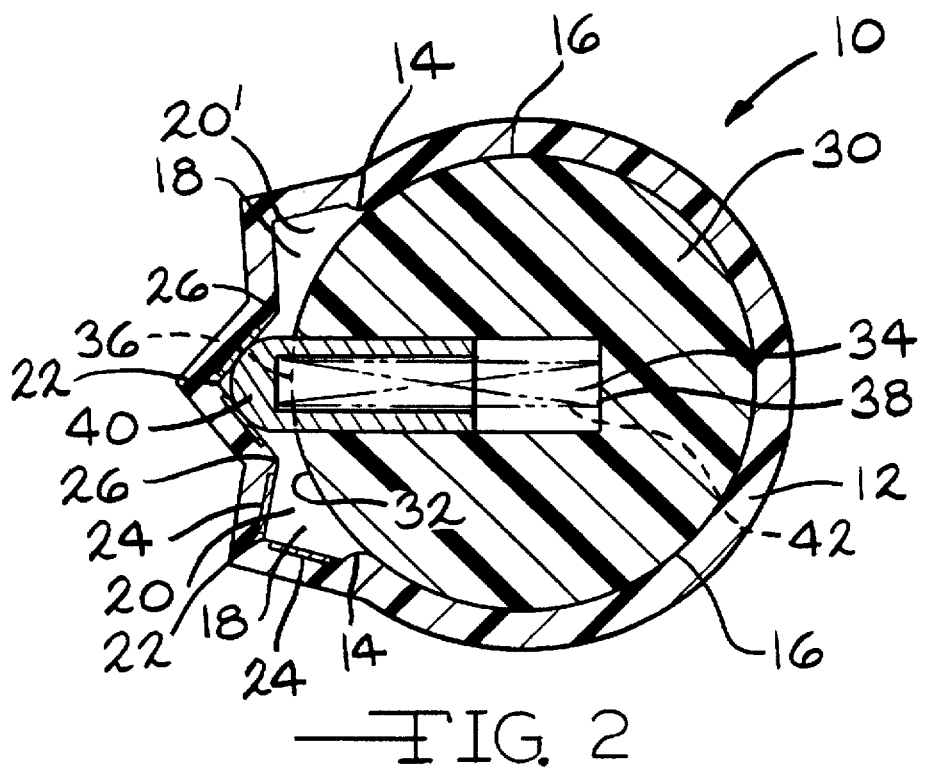
FIG. 2 is a cross-sectional view taken along line 2—2 of FIG. 1.

FIGS. 1 and 2 show an electrical switch 10 comprising an insulator body 12 having surface 14 wherein body 12 defines recess 16 extending into body 12. Recess 16 has an open end at surface 14 and closed end 18 extending into body 12. Body 12 also defines a plurality of cavities 20 extending from closed end 18 of recess 16 into body 12. Cavities 20 have an open end at closed end 18 of recess 16 and closed end 22 extending into body 12. Closed end 22 of at least one cavity 20 houses a pair of electrical contacts 24. Body 12 also defines raised shoulders 26 between the open ends of cavities 20.

Detent carrier 30 is at least partially housed within recess 16. Detent carrier 30 has a surface 32 adjacent surface 14 of body 12. Detent carrier 30 also defines cavity 34 extending from surface 32 into carrier 30. Cavity 34 houses electrically conductive plunger 40 and spring 42. Plunger 40 is located near open end 36 and spring 42 is located near closed end 38.

Spring 42 brings plunger 40 into electrical engagement with a pair of electrical contacts 24 when open end 36 of cavity 34 is adjacent the open end of cavity 20 of insulator body 12. When open ends 18 and 36 are adjacent plunger 40 extends into cavity 20. In an alternative embodiment, shown in FIG. 2 at least one cavity 20 is in an off position and contains no electrical contacts.

Generally, an actuating knob 50, not shown in FIG. 1, is attached to detent carrier 30 for rotating within recess 16 of insulator body 12. Cavity 34 housing plunger 40 constrains plunger 40 to move along a vertical path towards or away from cavities 20 of insulator body 12. Shoulders 26 vertically move plunger 40 away from cavities 20 and compress spring 42 when cavity 34 is adjacent shoulder 26.

Generally, insulator body 12 is a molded plastic and electrical contacts 24 are molded into insulator body 12. Preferably, insulator body 12 is a molded polymer such as a molded polyamide (nylon).

More specifically, electrical switch 10 is a rotary switch comprising insulator body 12 having internal recess 16 having an open end and closed base 18 defining a plurality of cavities 20, at least one cavity 20 housing a pair of electrical contacts 24.

Rotatable detent carrier 30 is at least partially housed within recess 16. Detent carrier 30 also defines cylindrical guide tube 34 having a longitudinal axis, tube 34 having a forward aperture 36 and a rearward, closed end 38. Tube 34 houses generally cylindrical electrically conductive plunger 40 near aperture 36 and spring 42 near rearward end 38.

When spring 42 brings plunger 40 into electrical engagement with a pair of electrical connectors 24 in cavity 20, aperture 36 is adjacent cavity 20 of insulator body 12 containing a pair of electrical connectors 24. Raised shoulders 26 between cavities 20 move plunger 40 towards end 38 when tube 34 is adjacent shoulder 26.

Detent carrier 30 also is made of a non-conductive material such as plastic, polymer or polyamide. The non-conductive materials for detent carrier 30 and insulator body 12 can vary widely. For example, polyimides can be used in place of polyamides.

In operation, a longitudinally movable plunger is enclosed within the detent carrier and extends outwardly therefrom. The plunger is moveable between an extended position wherein the tip of the plunger is disposed into a cavity of the insulator cavity where the tip makes electrical contact with electrical contacts. In a retracted position, the tip of the plunger is pulled away from the insulator cavity and makes contact with a shoulder of the insulator body. The spring is extended when the tip makes electrical contact and compressed when making non-electrical 15 contact with a shoulder.

I claim:

1. An electrical switch comprising:
    an insulator body having a surface wherein the body defines a recess extending into the body, the recess having an open end at the surface and a closed end extending into the body,
    the body also defining a plurality of cavities extending from the closed end of the recess into the body,
    each cavity having an open end at the closed end of the recess and a closed end extending into the body,
    the closed end of at least one cavity housing a pair of electrical contacts, the body also defining raised shoulders between the open ends of the cavities within the recess; and
    a detent carrier at least partially housed within the recess of the body, the detent carrier having a surface adjacent the closed end of the recess, the detent carrier defining a cavity extending from the surface of the carrier into the carrier,
    the cavity of the detent carrier having an open end at the surface of the carrier and a closed end in the carrier,
    the cavity of detent carrier housing an electrically conductive plunger and a means for moving the plunger within the cavity of the detent carrier, the plunger being located near the open end of the carrier's cavity and the spring being located near the closed end of the carrier's cavity.

2. An electrical switch according to claim 1 wherein the means for moving the plunger brings the plunger into electrical engagement with a pair of electrical contacts in the closed end of a cavity of the insulator body when the open end of the cavity defined by the detent carrier is adjacent the open end of a cavity of the insulator body containing a pair of electrical contacts.

3. An electrical switch according to claim 2 wherein the plunger extends into the cavity of the insulator body to make the electrical engagement.

4. An electrical switch according to claim I wherein at least one cavity of the insulator body is an off position and contains no electrical contacts.

5. An electrical switch according to claim 1 including an actuating knob attached to the detent carrier for rotating the detent carrier with the recess of the insulator body.

6. An electrical switch according to claim 1 wherein the insulator body is a molded plastic.

7. An electrical switch according to claim 6 wherein the electrical contacts are molded into the insulator body.

8. An electrical switch according to claim 1 wherein the insulation body is a molded polymer.

9. An electrical switch according to claim 1 wherein the insulation body is molded polyamide.

10. A switch according to claim 1 wherein the cavity housing the plunger constrains the plunger to move along a vertical path towards or away from the cavities of the insulator body.

11. A switch according to claim 10 wherein the means for moving the plunger is a spring.

12. A switch according to claim 11 wherein the shoulders vertically move the plunger away from the cavities of the insulator body and compress the spring when the cavity of the carrier is adjacent a shoulder.

13. A rotary electrical switch comprising:
    a insulator body having an internal recess, the recess having an open end and a closed base, the closed base defining a plurality of cavities, at least one cavity housing a pair of electrical contacts; and
    a rotatable detent carrier at least partially housed within the recess of the body, the detent carrier defining a cylindrical guide tube having a longitudinal axis, the tube having a forward aperture and a rearward, closed end, the tube housing a generally cylindrical electrically conductive plunger near the aperture and a means for moving the plunger near the rearward end.

14. An electrical switch according to claim 13 wherein the means for moving the plunger is a spring.

15. An electrical switch according to claim 14 wherein the spring brings the plunger into electrical engagement with the pair of electrical contacts in the cavity of the insulator body when the aperture of the tube defined by the detent carrier is adjacent the cavity of the insulator body containing a pair of electrical contacts.

16. An electrical switch according to claim 13 comprising raised shoulders between the cavities of the closed base.

* * * * *